(12) United States Patent
Du et al.

(10) Patent No.: US 12,119,518 B2
(45) Date of Patent: Oct. 15, 2024

(54) PROTECTION ASSEMBLY OF BATTERY MODULE AND BATTERY MODULE

(71) Applicants: CALB Co., Ltd., Jiangsu (CN); CALB Technology Co., Ltd., Jiangsu (CN)

(72) Inventors: Xiaoyuan Du, Luoyang (CN); Keqiang Cheng, Changzhou (CN); Liangjie Gu, Luoyang (CN); Lihui Chang, Luoyang (CN); Qixin Guo, Luoyang (CN)

(73) Assignees: CALB Co., Ltd., Jiangsu (CN); CALB Technology Co., Ltd., Jiangsu (CN)

(*) Notice: Subject to any disclaimer, the term of this patent is extended or adjusted under 35 U.S.C. 154(b) by 407 days.

(21) Appl. No.: 17/153,884

(22) Filed: Jan. 21, 2021

(65) Prior Publication Data
US 2021/0344089 A1 Nov. 4, 2021

(30) Foreign Application Priority Data

Apr. 30, 2020 (CN) .......................... 202010361979.0
Nov. 17, 2020 (CN) .......................... 202011286703.7

(51) Int. Cl.
*H01M 50/588* (2021.01)
*H01M 10/48* (2006.01)
(Continued)

(52) U.S. Cl.
CPC ......... *H01M 50/588* (2021.01); *H01M 10/48* (2013.01); *H01M 50/569* (2021.01); *H01M 50/593* (2021.01)

(58) Field of Classification Search
CPC ............. H01M 50/588; H01M 50/593; H01M 50/584; H01M 50/569; H01M 10/04;
(Continued)

(56) References Cited

U.S. PATENT DOCUMENTS

2009/0214936 A1* 8/2009 Yang .................... H01M 50/569
429/61
2013/0288530 A1* 10/2013 Zhao .................... H01M 50/503
439/627
(Continued)

FOREIGN PATENT DOCUMENTS

CN 101777663 7/2010
CN 207664135 7/2018
(Continued)

OTHER PUBLICATIONS

"Search Report of Europe Counterpart Application", issued on Aug. 31, 2021, p. 1-p. 7.
(Continued)

*Primary Examiner* — Matthew T Martin
*Assistant Examiner* — Jessie Walls-Murray
(74) *Attorney, Agent, or Firm* — JCIP GLOBAL INC.

(57) ABSTRACT

A protection assembly of a battery module and a battery module are provided, which include a base disposed with a supporting portion, an accommodating portion, and a separating portion. The supporting portion is configured to dispose a positive lead and/or a negative lead of a busbar. The accommodating portion is configured to accommodate a low-voltage connector for transmitting a signal of the battery module to a battery management system. The supporting portion and the accommodating portion are located on the same side of the battery module. The separating portion is located between the supporting portion and the accommodating portion, and is configured to separate the low-voltage connector from the positive lead and/or the negative lead. In the protection assembly of the battery module, the positive lead and/or the negative lead and the low-voltage connector are respectively disposed on the supporting portion and the accommodating portion.

16 Claims, 6 Drawing Sheets

(51) Int. Cl.
*H01M 50/569* (2021.01)
*H01M 50/593* (2021.01)

(58) Field of Classification Search
CPC ............. H01M 50/284; H01M 50/298; H01M 50/296; H01M 50/50; H01M 50/503; H01M 50/507; H01R 13/73; H01R 24/00; H01R 4/185
See application file for complete search history.

(56) References Cited

U.S. PATENT DOCUMENTS

| | | | | |
|---|---|---|---|---|
| 2014/0113494 | A1* | 4/2014 | Kinoshita | H01M 50/503 439/627 |
| 2019/0334152 | A1* | 10/2019 | Shimizu | H01M 50/569 |
| 2020/0194744 | A1* | 6/2020 | Wang | H01M 10/425 |
| 2021/0242541 | A1* | 8/2021 | Sasaki | H01R 13/518 |

FOREIGN PATENT DOCUMENTS

| | | |
|---|---|---|
| CN | 209626503 | 11/2019 |
| CN | 210136898 | 3/2020 |

OTHER PUBLICATIONS

Office Action of China Counterpart Application, with English translation thereof, issued on Jul. 12, 2022, pp. 1-14.

\* cited by examiner

PROTECTION ASSEMBLY OF BATTERY MODULE AND BATTERY MODULE

CROSS-REFERENCE TO RELATED APPLICATION

This application claims the priority benefit of China application no. 202010361979.0, filed on Apr. 30, 2020, and China patent application no. 202011286703.7, filed on Nov. 17, 2020. The entirety of the above-mentioned patent application is hereby incorporated by reference herein and made a part of this specification.

BACKGROUND

Technical Field

The disclosure relates to the technical field of batteries, and in particular to a protection assembly of a battery module and a battery module.

Description of Related Art

Due to the progress of new energy technology and the vigorous promotion by government agencies in various countries, the application of new energy batteries is becoming more and more extensive, for example, in the field of power vehicles. At present, when the high-voltage component and the low-voltage connector assembly in the battery module are disposed on the same side, protection devices need to be separately disposed, which is not convenient for installation and disassembly.

SUMMARY

The disclosure provides a protection assembly of a battery module, which includes the following. A base is disposed with a supporting portion, an accommodating portion, and a separating portion. The supporting portion is configured to disposed a positive lead and/or a negative lead of a busbar of the battery module. The accommodating portion is configured to accommodate a low-voltage connector of the battery module. The low-voltage connector is configured to transmit a signal of the battery module to a battery management system. The supporting portion and the accommodating portion are located on the same side of the battery module. The separating portion is located between the supporting portion and the accommodating portion, and is configured to separate the low-voltage connector from the positive lead, and/or separate the low-voltage connector from the negative lead.

The disclosure also provides a battery module, which includes the protection assembly of the battery module.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DETAILED DESCRIPTION OF DISCLOSED EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 6:
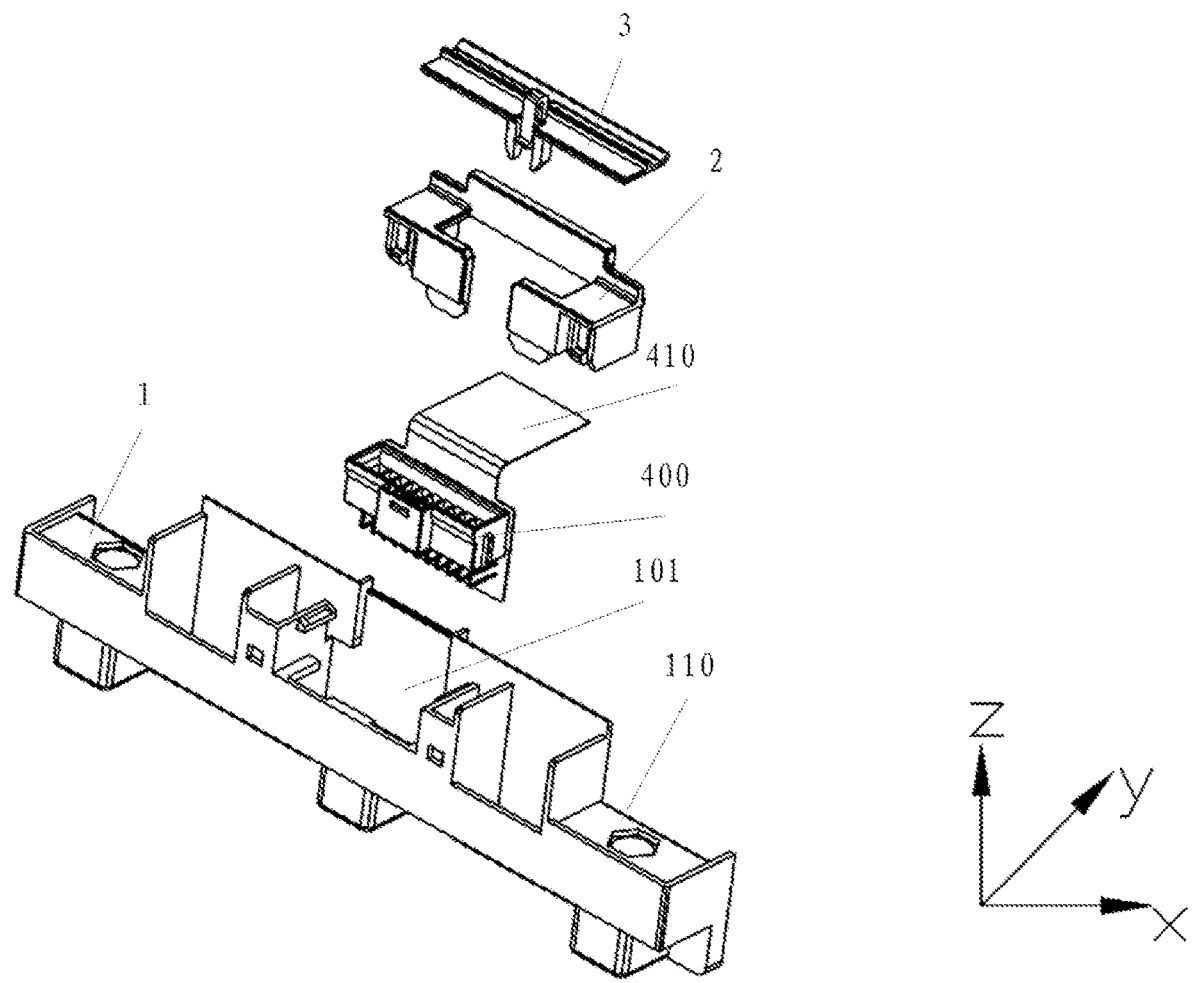
FIG. 6 is an exploded view of a protection assembly of a battery module according to an embodiment of the disclosure.

In the disclosure, a first direction is the Y direction as shown in FIG. 6, the bottom of a first side plate is the opposite direction of the Z direction shown in FIG. 6, and the X, Y, and Z directions are all directions shown in FIG. 6.

Please refer to FIG. 1 to FIG. 7. The disclosure provides a protection assembly, which includes the following. A base 1 is disposed with a supporting portion 110, an accommodating portion 100, and a separating portion 120. The supporting portion 110 is configured to dispose a positive lead and/or a negative lead of a busbar of a battery module. The accommodating portion 100 is configured to accommodate a low-voltage connector of the battery module. The low-voltage connector is configured to transmit a signal of the battery module to a battery management system. The supporting portion 110 and the accommodating portion 100 are located on the same side of the battery module. The separating portion 120 is located between the supporting portion 110 and the accommodating portion 100, and is configured to separate the low-voltage connector from the positive lead, and/or separate the low-voltage connector from the negative lead.

In the protection assembly of the battery module of the disclosure, the separating portion 120 may separate the low-voltage connector from the positive lead and/or the negative lead of the busbar to reduce the probability of safety issues between the low-voltage connector and the positive lead and/or the negative lead of the busbar. Such arrangement is also convenient for protecting the low-voltage connector and the positive lead and/or the negative lead of the busbar. Moreover, since the positive lead and/or the negative lead of the busbar and the low-voltage connector are respectively disposed on the supporting portion and the accommodating portion of the base, and the supporting portion and the accommodating portion are located on the same side, installation and disassembly are convenient.

Figure 1:
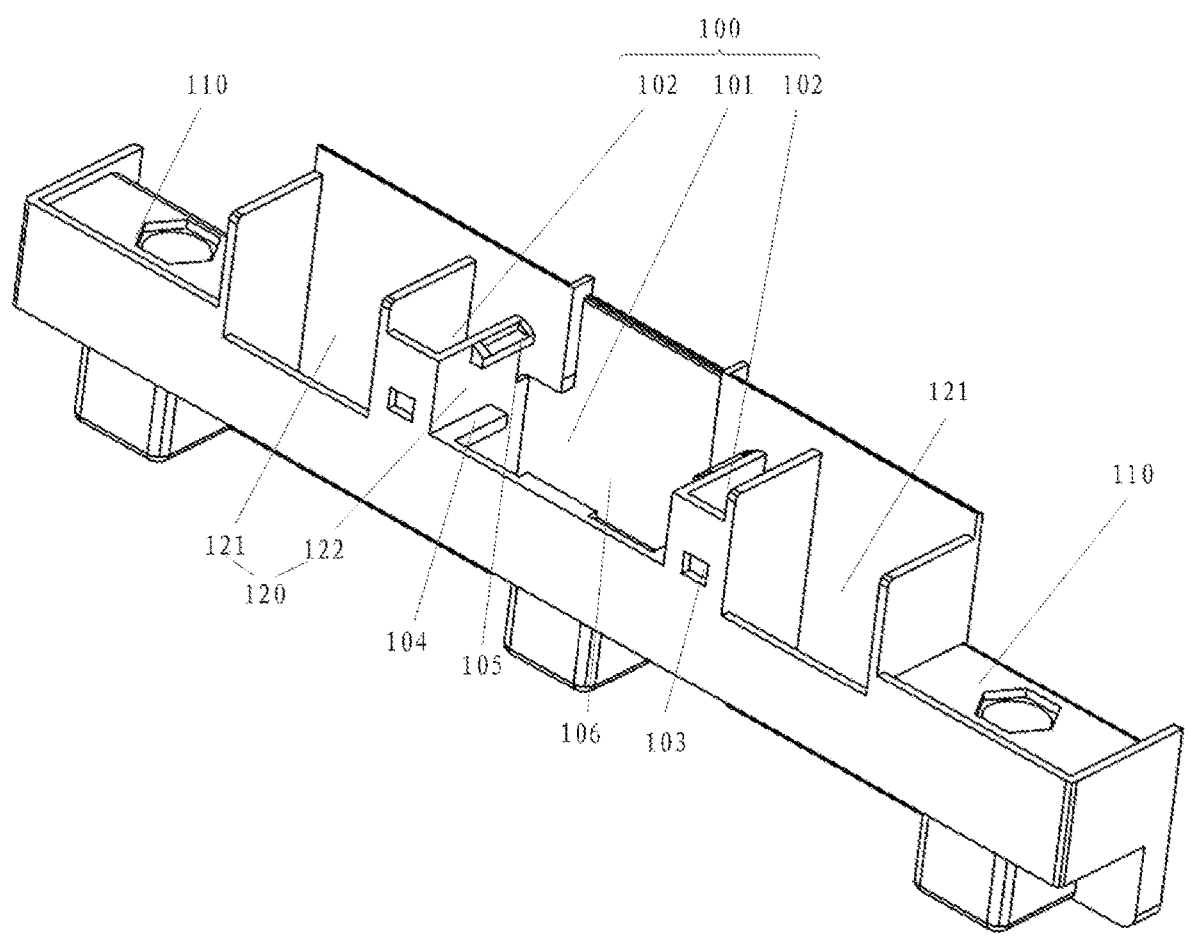
FIG. 1 is a schematic structural view of a base of a protection assembly of a battery module according to an embodiment of the disclosure.
Figure 7:
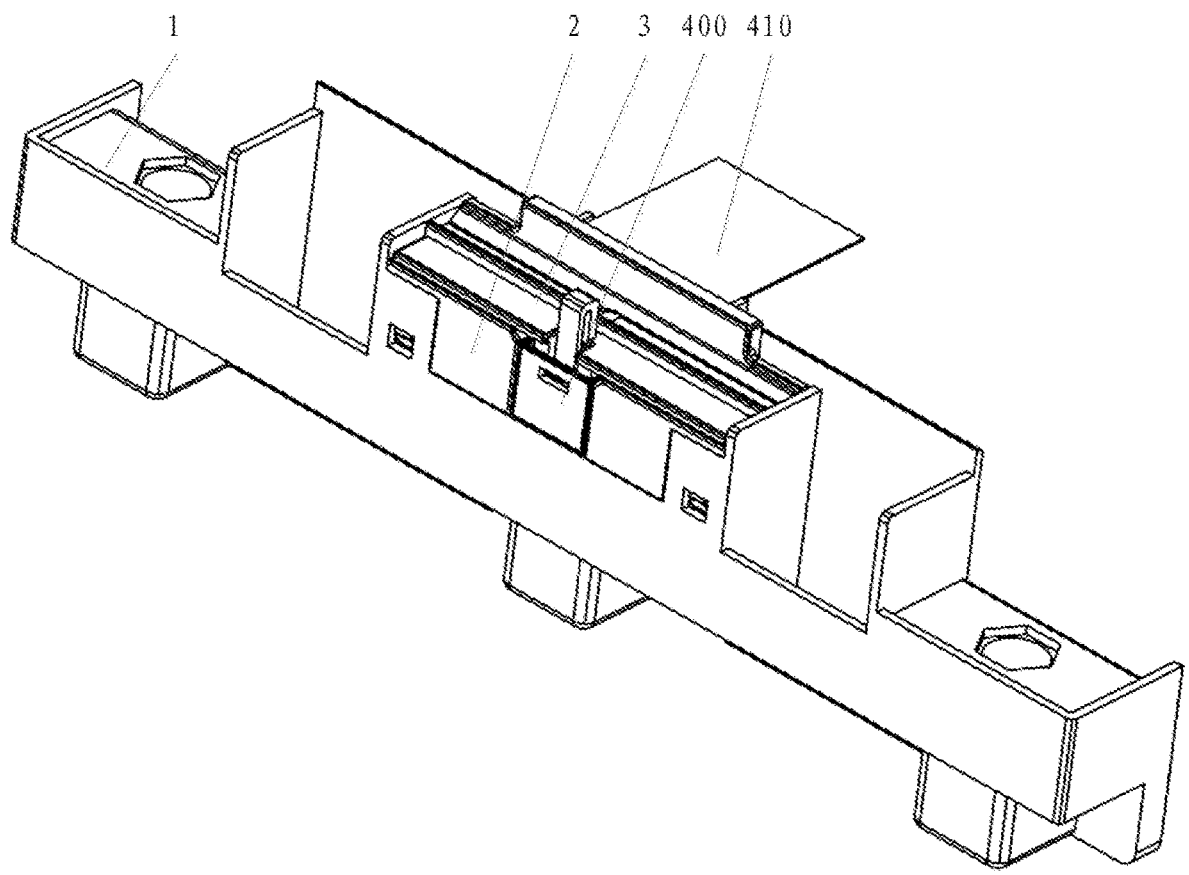
FIG. 7 is a schematic structural view of a protection assembly after installation of a battery module according to an embodiment of the disclosure.

Please refer to FIG. 1, FIG. 6, and FIG. 7. The disclosure provides a protection assembly, which includes the following. A base 1 is disposed with an accommodating portion 100 for accommodating a first voltage assembly 4 and a supporting portion 110 for placing a second voltage assembly. The accommodating portion 100 is configured to separate the first voltage assembly 4 from the second voltage assembly.

In a protection assembly of a battery module of the disclosure, a base 1 is disposed with an accommodating portion 100 and a supporting portion 110. A first voltage assembly 4 disposed in the accommodating portion 100 and a second voltage assembly disposed in the supporting portion 110 are separated by the accommodating portion 100 to reduce the probability of safety issues between the first voltage assembly 4 and the second voltage assembly.

It should be noted that the first voltage assembly 4 may be a low-voltage connector assembly or a high-voltage busbar, and the second voltage assembly may be a high-voltage busbar or a low-voltage connector assembly, but not limited thereto. As an example, the first voltage assembly 4 is a low-voltage connector assembly, the second voltage assembly is a high-voltage busbar, and the busbar has a positive lead and a negative lead. Please continue to refer to FIG. 4 and FIG. 5. The low-voltage connector assembly includes a low-voltage connector 400, a free pascal compiler (FPC) assembly 410, and a reinforcement plate 420 of the connector. As an example, the low-voltage connector 400, the FPC assembly 410, and the reinforcement plate 420 of the connector are combined together through hot pressing or gluing. The reinforcement plate 420 is disposed with a guide positioning hole 421. When assembling the connector, the base 1 is disposed with a third buckle 130. The third buckle 130 is matched with the guide positioning hole 421 disposed on the reinforcement plate 420 to cooperate with the guide positioning of the base 1, so as to implement the engagement cooperation between the low-voltage connector assembly and the base 1. In order to implement the management and control of the battery module, it is necessary to collect at least one signal of the voltage, current, temperature, etc. of the battery of the battery module to be transmitted to a battery management system (BMS). As an example, the FPC collects at least one signal of the voltage, temperature, etc. of the battery through a nickel sheet, and transmit the collected at least one signal of the voltage, temperature, etc. to the low-voltage connector. The low-voltage connector implements the connection with the BMS through an external wiring harness to transmit the signal to the BMS.

In addition, the low-voltage connector assembly further includes a connection groove 430 disposed on the side of the low-voltage connector 400 away from the reinforcement plate 420. A second engagement opening 431 is disposed on the side of the connection groove 430 away from the low-voltage connector 400. The second engagement opening 431 is configured to be engaged with a second buckle 330 on a protection cap 3.

As an alternative, there are two supporting portions 110, and the accommodating portion 100 is disposed between the two supporting portions 110. The two supporting portions 110 are respectively configured to dispose the positive lead and the negative lead, which is highly integrated and convenient for wiring.

As an alternative, referring to FIG. 1, the separating portion 120 adopts an insulating material, the separating portion 120 includes two separating cavities 121, and the separating cavities 121 are disposed between both the two supporting portions 110 and the accommodating portion 100. The accommodating portion 100, the two supporting portions 110, and the separating portion 120 are integrally disposed, which may increase the strength of the protection assembly. In addition, the separating portion 120 adopts an insulating material, which can further improve the function of the separating portion 120.

It should be noted that the base 1 is disposed with a supporting interface along the X direction. The supporting interface may be placed with the second voltage assembly of the positive lead and the negative lead of the battery module, that is, the supporting interface is the supporting portion 110. As an example, the second voltage assembly may be a busbar, so the positive lead and/or the negative lead of the busbar may be disposed in the supporting portion. In addition, the separating cavity 121 may be disposed between the supporting portion 110 and the accommodating portion 100 to increase the distance between the first voltage assembly 4 and the second voltage assembly, so as to improve the electrical isolation performance.

Figure 2:
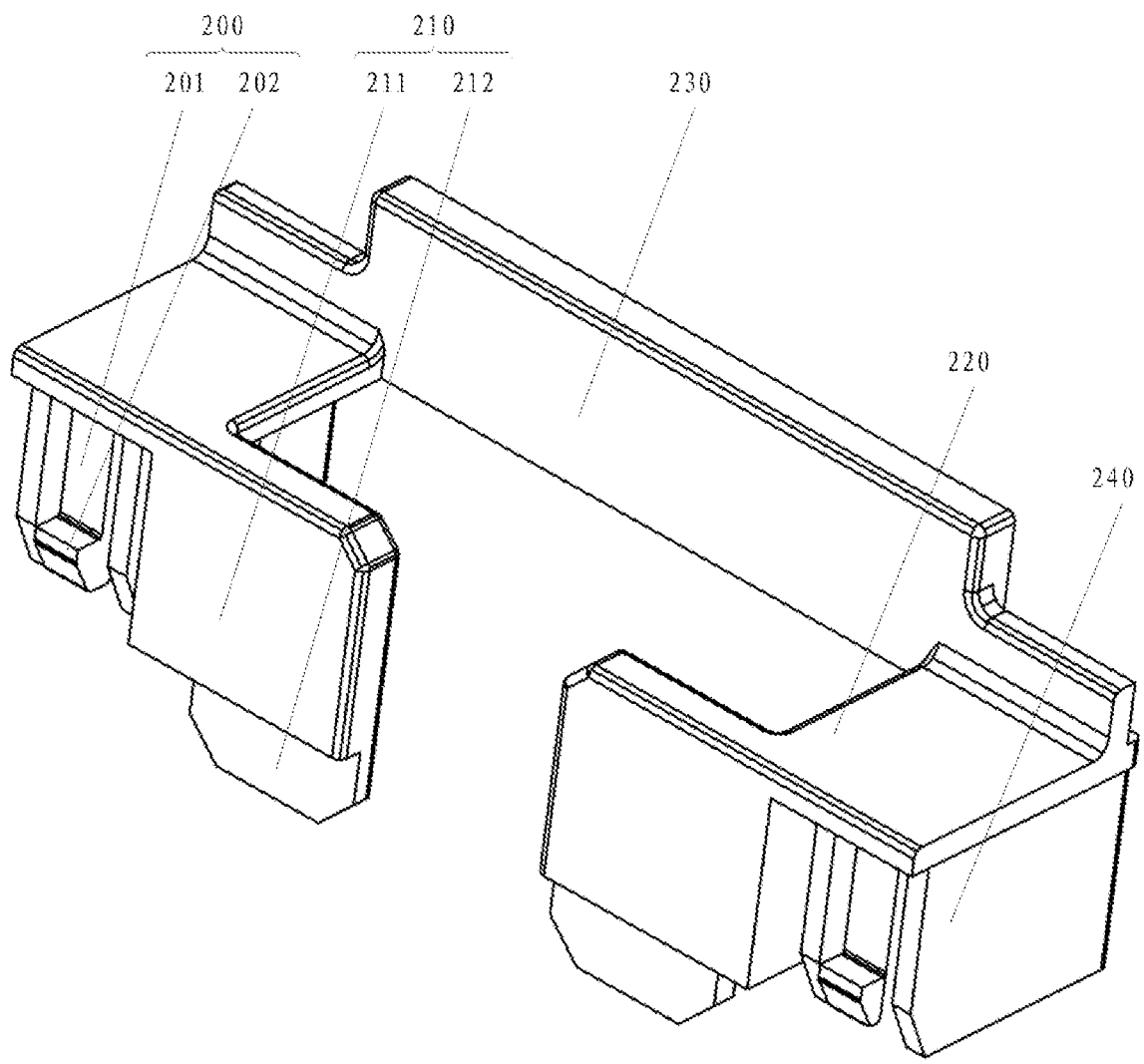
FIG. 2 is a schematic structural view of a fixing frame of a protection assembly of a battery module according to an embodiment of the disclosure.

As an alternative, referring to FIG. 1 and FIG. 2, the accommodating portion 100 includes an accommodating cavity 101 for accommodating the low-voltage connector. The accommodating portion 100 further includes a first opening 106. The first opening 106 is communicated with the accommodating cavity 101. The first opening 106 is configured for the low-voltage connector to move into the accommodating cavity 101 along the first direction or for the low-voltage connector to move out of the accommodating cavity 101 along the opposite direction of the first direction. A fixing frame 2 is further included, which includes a limiting member 210 for covering the first opening 106 to limit the movement of the low-voltage connector along the opposite direction of the first direction. The arrangement of the first opening 106 may facilitate the installation of the low-voltage connector in the accommodating cavity 101, and the fixing frame 2 may cover the first opening 106 to limit the movement of the low-voltage connector in the opposite direction of the first direction, so that the low-voltage connector is stably disposed in the accommodating cavity 101. In addition, such arrangement is convenient for disassembly. As an alternative, the side wall of the accommodating cavity 101 adopts an insulating material, and the separating portion 120 includes a side wall 122 of the accommodating cavity. Specifically, the side wall between the accommodating cavity 101 and the separating cavity adopts an insulating material, which further isolates the low-voltage connector disposed in the accommodating portion 100 and the positive lead and/or the negative lead of the busbar disposed on the supporting portion 110. The number of the side wall of the accommodating cavity is not limited thereto.

Figure 4:
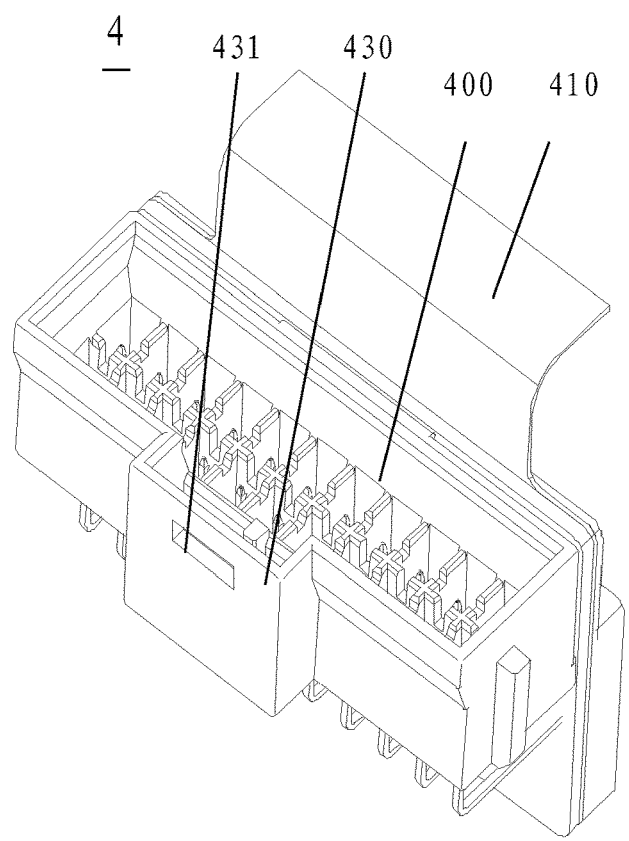
FIG. 4 is a schematic structural view of a low-voltage connector in a protection assembly of a battery module according to an embodiment of the disclosure.
Figure 5:
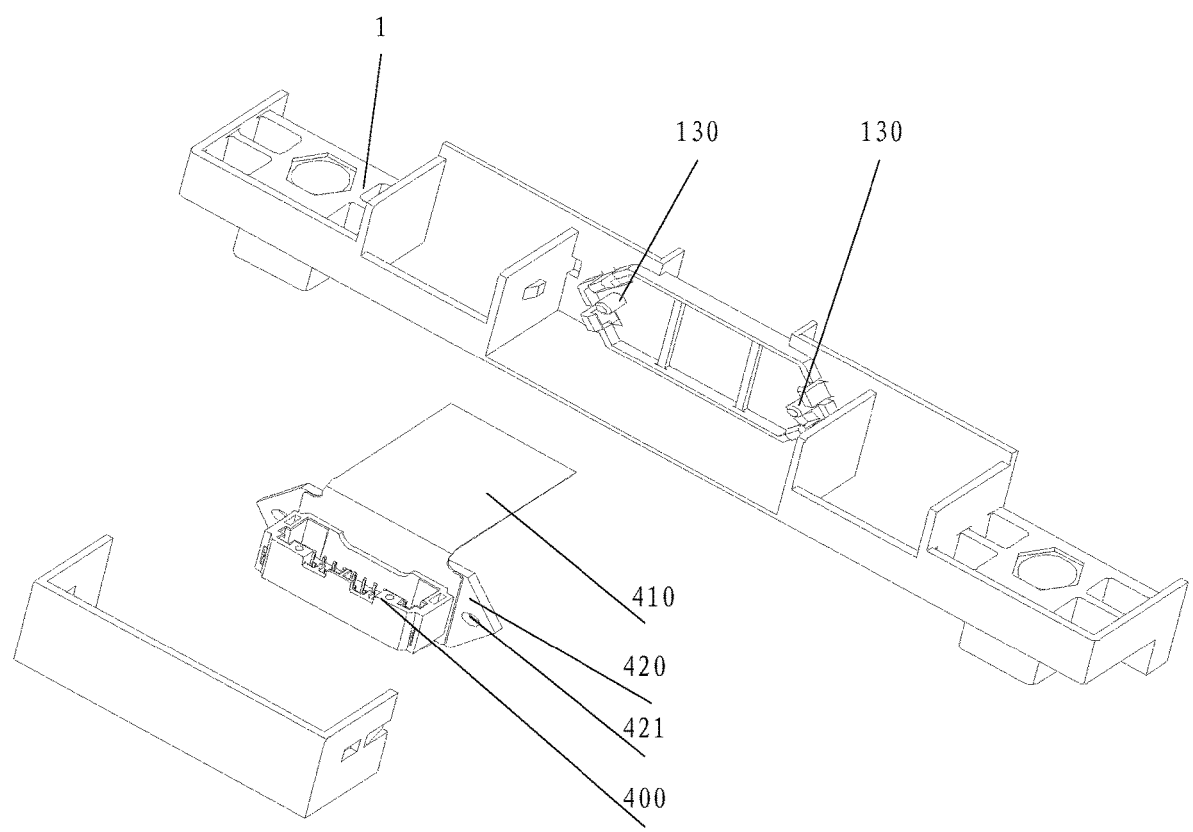
FIG. 5 is a schematic structural view of a low-voltage connector installed on a base in a protection assembly of a battery module according to an embodiment of the disclosure.

As an alternative, please continue to refer to FIG. 1, FIG. 2, and FIG. 4. The fixing frame 2 for limiting the movement of the first voltage assembly 4 in the accommodating portion 100 along the opposite direction of the first direction is further included. When the first voltage assembly 4 is disposed in the accommodating portion 100, the first voltage assembly 4 is limited in the Z direction and the X direction, and the fixing frame 2 further limits the movement of the first voltage assembly 4 in the opposite direction of the first direction to reduce the occurrence of the connector being shaken by force when the module is under vibration, impact, and other working conditions, which improves the reliability of collection by the first voltage assembly 4 disposed in the accommodating portion 100.

It should be noted that the fixing frame 2 is engaged into the accommodating portion 100, or the fixing frame 2 is connected to the accommodating portion 100 through bolt connection.

As an alternative, the accommodating portion 100 includes the accommodating cavity 101 for accommodating the first voltage assembly 4. The accommodating cavity 101 is configured to be engaged with a low-voltage connector to accommodate the low-voltage connector. Specifically, a frame 104 is disposed in the accommodating cavity 101. Two side walls of the accommodating cavity 101 close to an installation cavity 102 are disposed with a fixing portion 105 corresponding to the frame 104. The fixing portion 105 is disposed above the frame 104, so that a space for accommodating the low-voltage connector may be formed between the fixing portion 105 and the frame 104. When the low-voltage connector 400 is disposed in the accommodating cavity 101, the top surface of the low-voltage connector 400 abuts against the fixing portion 105, the bottom surface of the low-voltage connector 400 abuts against the frame 104, and the side wall of the low-voltage connector 400 abuts against the side wall of the accommodating cavity 101 close to the installation cavity 102, so that the accommodating portion 100 may limit the movement of the low-voltage connector 400 along the X direction and the Z direction to improve the stability of the first voltage assembly 4.

As an alternative, referring to FIG. 1 and FIG. 2, the limiting member 210 includes a first side plate 211 for covering the first opening 106, and a limiting plate 212 disposed under the first side plate 211. The limiting plate 212 is configured to abut against the inner wall of the accommodating cavity 101 in the opposite direction of the first direction to limit the movement of the low-voltage connector along the first direction. Under such arrangement, the first side plate 211 is located above the side wall of the accommodating cavity 101, and may abut against the top portion of the side wall of the accommodating cavity 101, so that the first side plate 211 does not move easily, which may further reduce the connector from being shaken by force when the module is under vibration, impact, and other working conditions.

As an alternative, referring to FIG. 2, the fixing frame 2 further includes an engagement member 200 connected to the limiting member 210. The engagement member 200 is configured to be engaged with the accommodating portion. In this way, the fixing frame 2 may be quickly installed on the accommodating portion.

As an alternative, the fixing frame 2 includes the engagement member 200 and the limiting member 210 for abutting against the inner wall of the accommodating cavity 101. The limiting member 210 is connected to the engagement member 200. The accommodating portion 100 further includes the installation cavity 102. The engagement member 200 cooperates with a first engagement opening 103 on the installation cavity 102.

As an alternative, referring to FIG. 1 and FIG. 2, the accommodating portion 100 further includes the installation cavity 102. The installation cavity 102 is located between the accommodating cavity 101 and the separating portion 120. The first engagement opening 103 is disposed on the side wall of the installation cavity 102. The engagement member 200 includes a first cantilever 201, and a first buckle 202 disposed on the first cantilever 201. The first buckle 202 is configured to cooperate with the first engagement opening 103. The ratio of the length of the first cantilever 201 to the thickness of the first cantilever 201 is not less than 5:1. In this way, the first cantilever 201 may be ensured to have sufficient deformation to prevent the first cantilever 201 from breaking when the first buckle 202 on the first cantilever 201 cooperates with the first engagement opening 103 in the installation cavity 102.

Specifically, the engagement member 200 penetrates the installation cavity 102, and cooperates with the first engagement opening 103 on the side wall of the installation cavity 102, so that the fixing frame 2 is easily connected onto the base 1 and the movement of the fixing frame 2 along the Z direction can be limited. The limiting member 210 is configured to abut against the inner wall of the accommodating cavity 101, so that when the movement of the fixing frame 2 in the Z direction is limited, the movement thereof in the Y direction is also limited, thereby reducing the connector from being shaken by force when the module is under vibration, impact, and other working conditions, which improves the reliability of collection by the first voltage assembly 4 disposed in the accommodating portion 100.

It should be noted that as an optional implementation, there are two installation cavities 102. The two installation cavities 102 are symmetrically disposed on two sides of the accommodating cavity 101.

As an alternative, the fixing frame 2 further includes a connection plate 220 for connecting the limiting member 210 and the engagement member 200. The engagement member 200 includes the first cantilever 201 connected under the connection plate 220, and the first buckle 202 disposed on the first cantilever 201 for cooperating with the first engagement opening 103. The limiting member 210 includes the first side plate 211 connected below the connection plate 220 and the limiting plate 212 disposed below the first side plate 211. The limiting plate 212 is configured to abut against the inner wall of the accommodating cavity 101.

Specifically, when the fixing frame 2 is installed in the installation cavity 102, the first buckle 202 disposed on the first cantilever 201 is connected to the first engagement opening 103 in the installation cavity 102, so that the fixing frame 2 is connected to the installation cavity 102. At this time, the limiting plate 212 below the first side plate 211 abuts against the inner wall of the accommodating cavity 101 to limit the position of the fixing frame 2 in the Z direction and the Y direction. At this time, the first side plate 211 abuts against the side wall on the side of the low-voltage connector 400 away from the reinforcement plate 420, thereby limiting the movement of the first voltage assembly 4 in the Y direction in the accommodating cavity 101. In addition, the limiting plate 212 is fixedly connected below the first side plate 211, and the thickness of the limiting plate 212 along the Y direction is less than the thickness of the first side plate 211 along the Y direction, so that the first side plate 211 is located above the side wall of the accommodating cavity and may abut against the top portion of the side wall of the accommodating cavity, which may further reduce the connector from being shaken by force when the module is under vibration, impact, and other working conditions.

It should be noted that there is a gap between the engagement member 200 and the limiting member 210, so that when the engagement member 200 is connected with the installation cavity 102, the limiting member 210 can extend into the accommodating cavity to abut against the side wall of the accommodating cavity.

It should be noted that the fixing frame 2 further includes a reinforcing rib 230. Two ends on one side of the reinforcing rib 230 are connected to two connection plates 220, and the two connection plates 220 are disposed at intervals. Each of the two connection plates 220 connects one of the two engagement members 200 and one of the two limiting members 210. Correspondingly, there are two installation cavities 102, and the two installation cavities 102 are symmetrically disposed on two sides of the accommodating cavity 101. In addition, the connection plate 220 is integrally disposed with the first cantilever 201 and the first side plate 211. A second side plate 240 is disposed on the side of the first cantilever 201 away from the accommodating cavity. The second side plate 240 is configured to abut against the inner wall of the installation cavity 102. The extending directions of the second side plate 240 and the first cantilever 201 are the same and the length of the second side plate 240 is greater than the length of the first cantilever 201 to prevent the first buckle 202 from breaking by force during the process insertion into the base 1 and/or after being inserted into the base 1.

As an alternative, the ratio of the length of the first cantilever 201 to the thickness of the first cantilever 201 is not less than 5:1. The first cantilever 201 may be ensured to have sufficient deformation to prevent the first cantilever 201 from breaking when the first buckle 202 on the first cantilever 201 cooperates with the first engagement opening 103 in the installation cavity 102.

It should be noted that the included angle between the bottom portion of the first buckle 202 and the first cantilever 201 should be less than or equal to 45° to facilitate the insertion of the first buckle 202 into the first engagement opening 103 of the installation cavity 102.

Figure 3:
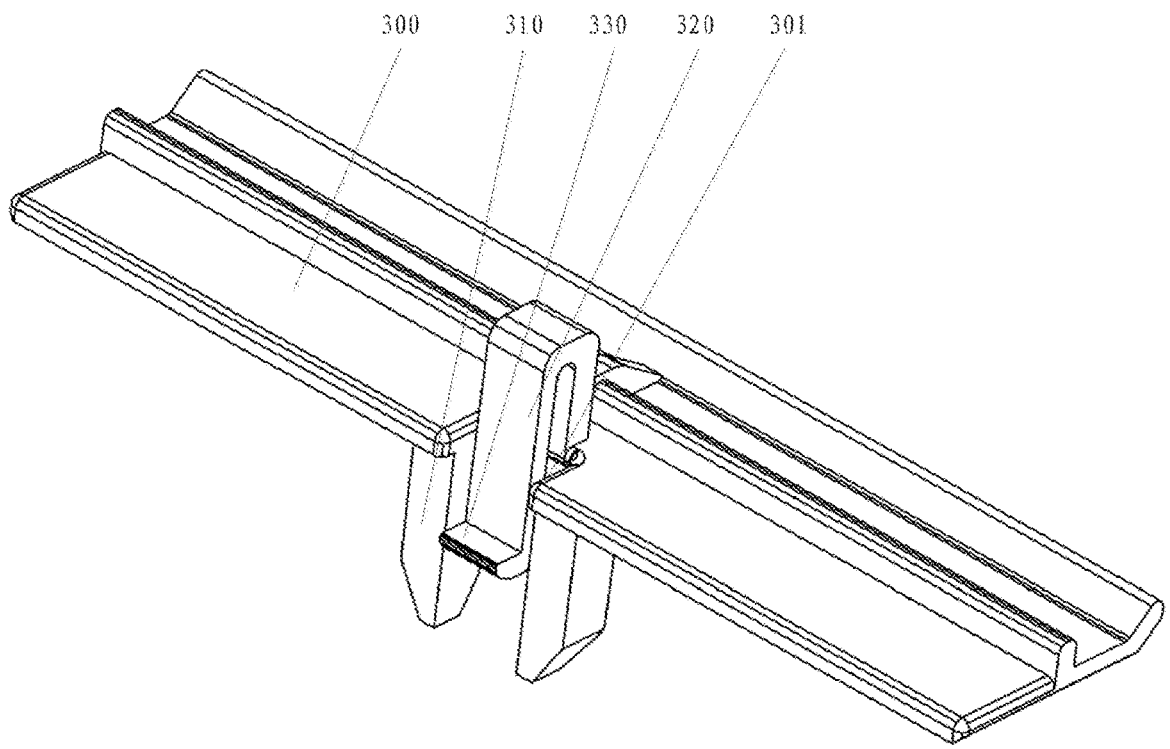
FIG. 3 is a schematic structural view of a protection cap of a protection assembly of a battery module according to an embodiment of the disclosure.

As an alternative, please continue to refer to FIG. 3. The protection cap 3 is further included, which is configured to be engaged onto the first voltage assembly 4. To prevent risks such as damage to the first voltage assembly 4 caused by a foreign object falling in during installation, transportation, and assembly, the protection cap 3 may satisfy the protection requirements of the first voltage assembly 4.

As an alternative, referring to FIG. 3 and FIG. 4, the protection cap 3 includes a second cantilever 320 and a body 300. The second cantilever 320 is connected to the body 300. The second cantilever 320 extends along the thickness direction of the body 300. The ratio of the length of the second cantilever 320 to the wall thickness of the second cantilever 320 is greater than or equal to 5:1. The second buckle 330 is disposed on a first end of the second cantilever 320. Correspondingly, the second engagement opening 431 is disposed on the low-voltage connector, and the second engagement opening 431 cooperates with the second buckle 330. As such, the second cantilever 320 may be ensured to have sufficient deformation to facilitate the second buckle 330 to exit from the second engagement opening 431 or snap into the second engagement opening 431 without easily breaking.

As an alternative, referring to FIG. 3, the protection cap 3 further includes a guide post 310 connected to the body 300. The guide post 310 extends along the thickness direction of the body 300. One end of the guide post 310 and the first end of the second cantilever 320 are located on the same side of the body 300, and the guide post 310 and the second cantilever 320 are parallelly disposed. In this way, the guide post 310 may guide the protection cap 3 during assembly.

As an alternative, referring to FIG. 3, there are two guide posts 310. The two guide posts 310 are respectively located on two sides of the second cantilever 320, which can improve the guiding effect of the guide posts 310.

As an alternative, referring to FIG. 3, a second end of the second cantilever 320 extends beyond the body 300 along the thickness direction of the body 300 to facilitate assembly or disassembly of the protection cap 3.

As an alternative, referring to FIG. 3, along the thickness direction of the body 300, the body 300 is disposed with a notch 301. The second cantilever 330 penetrates the notch 301. The setting of the notch 301 facilitates the rotation of the second cantilever 330, which in turn facilitates the cooperation between the protection cap 3 and the low-voltage connector, and facilitates observation during installation or disassembly, thereby implementing quick installation or disassembly of the protection cap 3.

As an alternative, the protection cap 3 includes the body 300 and the guide post 310 connected below the body 300. The notch 301 is disposed along the thickness direction of the body 300. The second cantilever 320 is disposed in the notch 301, and the second buckle 330 is disposed on the second cantilever 320. There are two guide posts 310, and the two guide posts 310 are located on two sides of the notch 301. The guide post 310 extends in a direction away from the body 300. The second cantilever 320 and the guide post 310 are parallelly disposed.

As an alternative, the guide post 310 under the body 300 cooperates with the low-voltage connector from the interval portion between the two connection plates 220, so that the space above the low-voltage connector is completely covered to prevent foreign objects, water droplets, etc. from entering the low-voltage connector. The protection cap may also be designed as being integrated with the fixing frame, etc., but is not limited thereto.

Specifically, the ratio of the length of the second cantilever 320 of the protection cap 3 to the wall thickness of the second cantilever 320 is in principle greater than or equal to 5:1, so as to ensure that the second cantilever 320 may have sufficient deformation to exit from the first voltage assembly 4 when the finger presses the second cantilever 320. The protection cap 3 is disposed with the guide post 310. Since the extending direction of the guide post 310 is the same as the extending direction of the second cantilever 320 (both extend along the Z direction), the length of the guide post 310 is greater than the length of the second cantilever 320 (that is, the lower surface of the guide post 310 is much lower than the lower surface of the second buckle 330 along the Z direction), and the guide post 310 has a sufficiently strong structure, the guide post 310 may act as a displacement guide during the assembly of the protection cap 3 to prevent the second buckle 330 from breaking when inserted.

It should be noted that the guide post 310 is directly inserted into the connection groove 430 in the first voltage assembly 4. Through the transitional fit with the connection groove 430 in the first voltage assembly 4, the displacement of the protection cap 3 in the X direction and the Y directions may be limited.

The disclosure also provides a battery module, which includes the above-mentioned protection assembly of the battery module. Optionally, a low-voltage connector, and a positive lead and/or a negative lead of a busbar are further included. The low-voltage connector, and the positive lead and/or the negative lead are located on the same side of the battery module. The beneficial effects produced are the same as the effects of the protection assembly of the battery module, and will not be repeated here.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A protection assembly of a battery module, comprising:
a base, disposed with a supporting portion, an accommodating portion, and a separating portion, wherein
the supporting portion is configured to dispose a positive lead and/or a negative lead of a busbar of the battery module;
the accommodating portion is configured to accommodate a connector of the battery module, wherein the connector is configured to transmit a signal of the battery module to a battery management system;
the supporting portion and the accommodating portion are located on a same side of the battery module;
the separating portion is located between the supporting portion and the accommodating portion, and is configured to separate the connector from the positive lead and/or to separate the connector from the negative lead,
the accommodating portion comprises an accommodating cavity for accommodating the connector;
the accommodating portion further comprises a first opening communicated with the accommodating cavity and configured for the connector to move into the accommodating cavity along a first direction or for the connector to move out of the accommodating cavity along an opposite direction of the first direction;
the protection assembly further comprises a fixing frame comprising a limiting member for covering the first opening to limit a movement of the connector along the opposite direction of the first direction;
the accommodating portion, the supporting portion, and the separating portion are integrally disposed;
the fixing frame further comprises an engagement member connected with the limiting member;
the engagement member is configured to be engaged with the accommodating portion;
the accommodating portion further comprises an installation cavity located between the accommodating cavity and the separating portion;
a first engagement opening is disposed on a side wall of the installation cavity;
the engagement member comprises a cantilever and a buckle disposed on the cantilever of the engagement member and configured to cooperate with the first engagement opening; and
a ratio of a length of the cantilever of the engagement member to a thickness of the cantilever of the engagement member is not less than 5:1.

2. The protection assembly according to claim 1, wherein there are two supporting portions, the two supporting portions are respectively configured to dispose the positive lead and the negative lead, and the accommodating portion is disposed between the two supporting portions.

3. The protection assembly according to claim 2, wherein the separating portion adopts an insulating material and comprises two separating cavities, and the two separating cavities are disposed between each of the two supporting portions and the accommodating portion.

4. The protection assembly according to claim 1, wherein the limiting member comprises a first side plate for covering the first opening and a limiting plate disposed below the first side plate and configured to abut against an inner wall of the accommodating cavity in the opposite direction of the first direction to limit the movement of the connector along the opposite direction of the first direction.

5. The protection assembly according to claim 1, wherein the fixing frame further comprises a second side plate, extending direction of the second side plate and extending direction of the cantilever of the engagement member are the same, and a lower surface of the second side plate is lower than a lower surface of the cantilever of the engagement member along the extending direction of the second side plate.

6. The protection assembly according to claim 1, wherein:
the fixing frame further comprises a reinforcing rib, two ends on one side of the reinforcing rib are respectively connected with two connection plates, the two connection plates are disposed at intervals, there are two engagement members and two limiting members, and each of the two connection plates connects one of the two engagement members and one of the two limiting members; and correspondingly
there are two installation cavities, and the two installation cavities are symmetrically disposed on two sides of the accommodating cavity.

7. The protection assembly according to claim 1, wherein the accommodating cavity is configured to be engaged with the connector to accommodate the connector.

8. The protection assembly according to claim 1, further comprising a protection cap for protecting the connector and engaged with the connector.

9. The protection assembly according to claim 8, wherein:
the protection cap comprises a cantilever and a body, the cantilever of the protection cap is connected to the body, the cantilever of the protection cap extends along a thickness direction of the body, a ratio of a length of the cantilever of the protection cap to a wall thickness of the cantilever of the protection cap is greater than or equal to 5:1, and a first end of the cantilever of the protection cap is disposed with a buckle; and correspondingly,
a second engagement opening is disposed on the connector and cooperates with the buckle of the protection cap.

10. The protection assembly according to claim 9, wherein:
the protection cap further comprises a guide post connected to the body and extending along the thickness direction of the body, one end of the guide post and the first end of the cantilever of the protection cap are located on a same side of the body, the guide post and the cantilever of the protection cap are parallelly disposed.

11. The protection assembly according to claim 10, wherein
there are two guide posts, and the two guide posts are respectively located on two sides of the cantilever of the protection cap.

12. The protection assembly according to claim 10, wherein a lower surface of one end of the guide post is lower than a lower surface of the first end of the cantilever of the protection cap along an extending direction of the guide post.

13. The protection assembly according to claim 9, wherein the body is disposed with a notch along the thickness direction of the body, and the cantilever of the protection cap penetrates the notch.

14. The protection assembly according to claim 9, wherein a second end of the cantilever of the protection cap extends beyond the body along the thickness direction of the body.

15. A battery module, comprising a connector, a positive lead and/or a negative lead of a busbar, and the protection assembly according to claim 1, wherein the connector and the positive lead and/or the negative lead are located on a same side of the battery module.

16. A battery module, comprising a connector, a positive lead and/or a negative lead of a busbar, and the protection assembly according to claim 8, wherein the connector and the positive lead and/or the negative lead are located on a same side of the battery module.

* * * * *